United States Patent [19]

Sakai

[11] Patent Number: 4,639,810
[45] Date of Patent: Jan. 27, 1987

[54] MAGNETIC HEAD FOR PERPENDICULAR MAGNETIZATION

[75] Inventor: Kunihide Sakai, Ebina, Japan

[73] Assignee: Victor Company of Japan, Limited, Japan

[21] Appl. No.: 581,070

[22] Filed: Feb. 17, 1984

[30] Foreign Application Priority Data

Feb. 18, 1983 [JP] Japan ............................ 58-24756

[51] Int. Cl.⁴ .................. G11B 5/127; G11B 5/187
[52] U.S. Cl. ................................. 360/125; 360/110; 360/122
[58] Field of Search .............. 360/110, 113, 122, 123, 360/125–127, 111–112, 119; 29/603

[56] References Cited

U.S. PATENT DOCUMENTS 4,383,284  5/1983  Isshiki ........................... 360/125

FOREIGN PATENT DOCUMENTS 2344561  4/1975  Fed. Rep. of Germany .
3011696 10/1981  Fed. Rep. of Germany .
3120549  3/1982  Fed. Rep. of Germany .
0155814 12/1979  Japan ............................ 360/113
0163616 12/1980  Japan ............................ 360/110
8203938 11/1982  PCT Int'l Appl. .
2092807  8/1982  United Kingdom .

OTHER PUBLICATIONS

Patents Abstracts of Japan, vol. 6, No. 34, (P-104) (912), Mar. 2, 1982; & JP-A-56 153 516, JP-A-56 153 517, (Tokyo Shibaura Denki K.K.) 27-11-1981.
Patents Abstracts of Japan, vol. 5, No. 154, (P-82) (826), Sep. 29, 1981; & JP-A-56 87 217 (Tokyo Shibaura Denki K.K.) 15.07.1981.

Primary Examiner—John H. Wolff
Assistant Examiner—David J. Severin
Attorney, Agent, or Firm—Lowe, Price, LeBlanc, Becker & Shur

[57] ABSTRACT

A magnetic head for perpendicular magnetization has a pair of first and second blocks each composed of a nonmagnetic body and a ferromagnetic yoke joined together, a thin ferromagnetic film sandwiched between the first and second blocks, a coil wound around the thin film and the yoke of the first block, and a third ferromagnetic block attached to the first block remotely from the thin film and the second block. In a playback mode, a closed magnetic path is formed through a magnetic recording medium, the thin film, the yoke of the first block, and the third block.

7 Claims, 2 Drawing Figures

MAGNETIC HEAD FOR PERPENDICULAR MAGNETIZATION

BACKGROUND OF THE INVENTION

The present invention relates to a magnetic head for magnetically recording and reproducing signals in perpendicular magnetization.

Conventional magnetic recording employs a ring-type magnetic recording head for magnetizing a magnetic recording medium in the longitudinal direction thereof to produce a remanence parallel to the magnetic coating in the magnetic recording medium. With this recording process, if the signal packing density becomes higher, then the demagnetizing field produced in the magnetic recording medium is increased, causing attenuation and rotation of the remanence. The recorded signals then become difficult to detect.

To eliminate the above drawback with the prior longitudinal magnetic recording process, there has been proposed a perpendicular magnetization process for magnetizing the magnetic layer of the magnetic recording medium perpendicularly to the direction of travel of the magnetic recording medium. The perpendicular magnetization is advantageous in that as the signal packing density is increased, the demagnetizing field is reduced while the remanence is not reduced, from the standpoint of a theoretical analysis. This magnetization mode is thus capable of good recording and reproducing characteristics in high signal packing densities.

Known magnetic recording mediums used for perpendicular magnetization are made of a magnetic material, such as cobalt, chromium, and the like, having perpendicular magnetization anisotropy. Various magnetic heads are known for perpendicular magnetization.

One conventional magnetic head for perpendicular magnetization has a coil wound around a core for generating a recording magnetic field across and through a magnetic recording medium between the core and a main magnetic pole having a reduced thickness. This known magnetic head has an open magnetic path and hence suffers a poor efficiency as a playback head.

Another type of magnetic head for perpendicular magnetization includes a coil wound around a substantially C-shaped core including two arms having distal ends which have different surfaces areas and against which slides a magnetic recording medium composed of a magnetic recording layer and a thin film of high magnetic permeability below the magnetic recording layer. In operation, the magnetic head creates a closed magnetic path passing therethrough and through the thin film beneath the magnetic recording layer. The magnetic head of this type does not have the problem with the other prior head, but fails to magnetize the magnetic recording layer since there are limitations on efforts to reduce the surface areas of the distal ends of the arms of the core.

SUMMARY OF THE INVENTION

It is an object of the present invention to provide a magnetic head for perpendicular magnetization capable of sufficiently recording signals in a magnetic recording medium of high coercive force, of producing a closed magnetic path for a high playback efficiency, and having a high wear resistance.

According to the present invention, a magnetic head for perpendicular magnetization comprises a body of a nonmagnetic material having a surface for sliding contact with a magnetic recording medium, a film of a ferromagnetic material having a relatively high saturation magnetic density attached to a side of the block and having an end exposed in the surface, a coil wound around the film, and a block of a ferromagnetic oxide material attached to a side of the body for cooperating with the magnetic recording medium and the film in defining a closed magnetic path.

Further according to the present invention, a magnetic head for perpendicular magnetization comprises a pair of first and second blocks each having a body of a nonmagnetic material and a yoke of a ferromagnetic material joined to each other, the body having a surface for sliding contact with a magnetic recording medium, a film of a ferromagnetic material having a relatively high saturation magnetic density sandwiched between the first and second blocks and having an end exposed in the surface, a coil wound around the first block and the film, and a third block of a ferromagnetic material attached to the first block remotely from the film and the second block for cooperating with the magnetic recording medium, the film, and the yoke of the block in defining a closed magnetic path.

BRIEF DESCRIPTION OF THE DRAWINGS

The present invention will be described in detail by way of illustrative example with reference to the accompanying drawings, in which.

DETAILED DESCRIPTION

Figure 1:
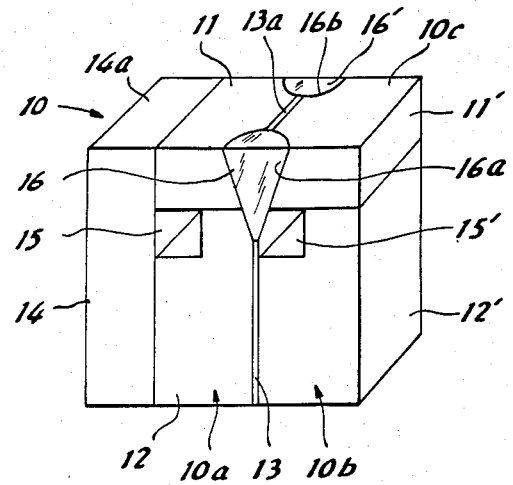
FIG. 1 is a perspective view of a magnetic head according to the present invention.

As illustrated in FIG. 1, a magnetic head generally designated by the reference numeral 10 comprises a pair of bodies 11, 11' made of a nonmagnetic material such as glass or ceramic, for example, and mounted respectively on a pair of yokes 12, 12' made of a ferromagnetic oxide material such as Mn-Zn ferrite, for example. The body 11 and the yoke 12 jointly form a first block 10a, and similarly the body 11' and the yoke 12' jointly form a second block 10b. The first and second blocks 10a, 10b have a surface 10c for sliding contact with a magnetic recording medium.

A thin film 13 is sandwiched between the first and second blocks 10a, 10b. The thin film 13 has a thickness (0.10 of about 3 μm, and is made of a ferromagnetic metal alloy such as Sendust or Permalloy or an amorphous metal alloy having a saturation magnetic flux density of 8,000 or higher gauss. The thin film 13 has an end 13a exposed in the surface 10c for sliding contact with a magnetic recording medium.

The magnetic head 10 also includes a third block 14 of a ferromagnetic oxide material such as Mn-Zn ferrite, for example, attached coextensively to the surface of the first block 10a remote from the thin film 13. The third block 14 has a thickness sufficiently greater than that of the thin film 13 so that an end 14a of the third block 14 for sliding contact with a magnetic recording medium has an area sufficiently larger than that of the end 13a of the thin film 13.

The yokes 12, 12' have holes 15, 15', respectively, adjacent to the bodies 11, 11' for winding a coil 17 (FIG. 2) in the holes 15, 15' and around the yoke 12 and the thin film 13. The first and second blocks 10a, 10b have a pair of semiconical recesses 16a, 16b extending through the bodies 11, 11' partly into the yokes 12, 12' and having the pointed ends directed away from the bodies 11, 11'. A pair of nonmagnetic semiconical bodies 16, 16, of glass fills the recesses 16a, 16b, respectively, and has larger ends exposed in the surface 10c and serving to limit the track width of the end 13a of the thin film 13 disposed in the surface 10c between the bodies 11, 11' transversely of the magnetic head 10.

For recording operation, a signal current is passed through the coil 17 to generate a magnetic field dependent on the signal current. Since the thin film 13 is of a small thickness and a high saturation magnetic flux density, the magnetic head 10 can sufficiently magnetize a magnetic recording medium of a high coercive force for permanent magnetization.

Figure 2:
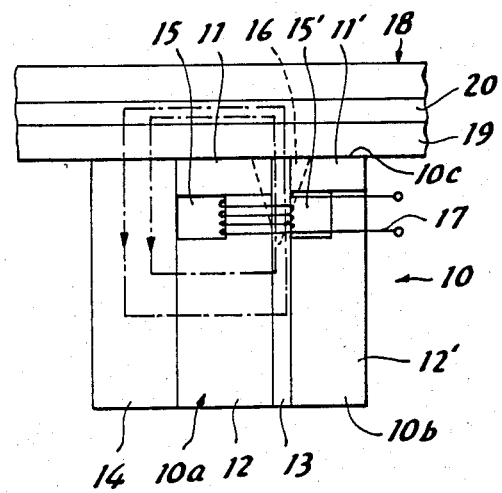
FIG. 2 is a side elevational view of the magnetic head of FIG. 1 as it it used with a magnetic recording medium, showing a magnetic path running through the magnetic head and the magnetic recording medium.

For reproducing recorded signals from a magnetic recording medium 18 (FIG. 2) slidably held against the magnetic head 10, a magnetic flux produced by the remanence in the magnetic recording medium 18 runs through the thin film 13 across the coil 17 and through the yoke 12, the third block 18, and a recording layer 19 for perpendicular magnetization and a thin film 20 of a high coercive force of the magnetic recording medium 18, thus constituting a closed magnetic path as shown by the dot-and-dash lines in FIG. 2. This arrangement allows the magnetic head 10 to have a high playback sensitivity.

Since the ferromagnetic yoke 12' is joined to the thin film 13, the thin film 13 is less magnetically saturatable. The magnetic head 10 has a surface for sliding contact with magnetic recording medium, and such a surface is composed of the nonmagnetic bodies 11, 11', the ferromagnetic block 14, and the glass bodies 16, 16' Accordingly, the surface of the magnetic head for sliding contact with a magnetic recording medium is highly resistant to wear. Because the thin film 13 is sandwiched between the nonmagnetic bodies 11, 11', the thin film 13 is protected against damage and remains effective in magnetizing a magnetic recording layer in a perpendicular magnetization mode.

Although a certain preferred embodiment of the present invention has been shown and described in detail, it should be understood that various changes and modifications may be made therein without departing from the scope of the appended claims.

What is claimed is:

1. A magnetic head for perpendicular magnetization, comprising:
   (a) a body of a nonmagnetic material having a surface for sliding contact with a magnetic recording medium;
   (b) a yoke of a ferromagnetic material, said body being mounted on said yoke;
   (c) a film of a ferromagnetic material having a relatively high saturation magnetic density held in direct contact with a side of said yoke and having an end exposed in said surface;
   (d) a coil wound around said yoke and said film in direct contact with said film; and
   (e) a block of a ferromagnetic oxide material attached to a side of said body and said yoke for cooperating with the magnetic recording medium, said film, and said yoke in defining a closed magnetic path.

2. A magnetic head as recited in claim 1 wherein said block of ferromagnetic oxide has a coplanar surface with a surface of the body of the nonmagnetic material for sliding contact with the magnetic recording medium.

3. A magnetic head for perpendicular magnetization, comprising:
   (a) a pair of first and second blocks each having a body of a nonmagnetic material and a yoke of a ferromagnetic material, said bodies being mounted on said yoke and each body having a surface for sliding contact with a magnetic recording medium;
   (b) a film of a ferromagnetic material having a relatively high saturation magnetic density sandwiched between said first and second blocks in direct contact with said yoke and having an end exposed in said surface;
   (c) a coil wound around said first block and said film in direct contact with said film, said second block having a hole through which said coil is wound; and
   (d) a third block of a ferromagnetic oxide material attached to said first block remotely from said film and from said second block for cooperating with the magnetic recording medium, said film, and said yoke of said first block in defining a closed magnetic path.

4. A magnetic head according to claim 3, wherein said film has a thickness of about 3 $\mu$m.

5. A magnetic head according to claim 3, further including a pair of bodies of a nonmagnetic material disposed in said first and second blocks and having ends exposed in said surface of said first and second blocks to limit a track width of said end of said film.

6. A magnetic head according to claim 5, wherein each of said last-mentioned bodies comprises a semiconical mass of glass having a larger end exposed in said surface.

7. A magnetic head for perpendicular magnetization, comprising:
   (a) a pair of first and second blocks each having a body of a nonmagnetic material and a yoke of a ferromagnetic material joined to each other, each said body having a surface for sliding contact with a magnetic recording medium;
   (b) a film of a ferromagnetic material having a relatively high saturation magnetic density sandwiched between said first and second blocks and having an end exposed in said surface;
   (c) a coil would around said first block and said film; and
   (d) a third block of a ferromagnetic material attached to said first block remotely from said film and from said second block for cooperating with the magnetic recording medium, said film, and said yoke of said block in defining a closed magnetic path;
   said yokes of said first and second blocks having a pair of holes in which said coil is wound.

* * * * *